United States Patent
Liu et al.

(10) Patent No.: US 7,450,592 B2
(45) Date of Patent: Nov. 11, 2008

(54) LAYER 2/LAYER 3 INTERWORKING VIA INTERNAL VIRTUAL UNI

(75) Inventors: Kuo-Hui Liu, San Ramon, CA (US); Shih-Chung Soon, Dublin, CA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 973 days.

(21) Appl. No.: 10/704,715

(22) Filed: Nov. 12, 2003

(65) Prior Publication Data

US 2005/0100024 A1    May 12, 2005

(51) Int. Cl.
    *H04L 12/56* (2006.01)
(52) U.S. Cl. .................................. 370/395.52
(58) Field of Classification Search ............. 370/259, 370/356, 389, 392, 401, 469, 395.2, 399; 709/203, 223
    See application file for complete search history.

(56) References Cited

U.S. PATENT DOCUMENTS

| | | | |
|---|---|---|---|
| 5,920,566 A * | 7/1999 | Hendel et al. ............... | 370/401 |
| 5,923,643 A | 7/1999 | Higgins et al. | |
| 5,999,518 A | 12/1999 | Nattkemper | |
| 6,304,547 B1 | 10/2001 | Tsuruta et al. | |
| 6,424,659 B2 * | 7/2002 | Viswanadham et al. ..... | 370/469 |
| 6,480,888 B1 | 11/2002 | Pedersen | |
| 6,587,467 B1 * | 7/2003 | Morgenstern et al. ....... | 370/399 |
| 6,614,792 B1 | 9/2003 | Pazy et al. | |
| 6,980,553 B2 * | 12/2005 | Miki et al. ................ | 370/395.1 |
| 7,307,993 B2 * | 12/2007 | Cunetto et al. ........... | 370/395.2 |
| 2001/0032265 A1 | 10/2001 | Tanaka | |
| 2002/0031141 A1 | 3/2002 | McWilliams | |
| 2002/0089985 A1 | 7/2002 | Wahl et al. | |
| 2002/0174207 A1 * | 11/2002 | Battou ........................ | 709/223 |
| 2003/0043791 A1 | 3/2003 | Kato | |
| 2003/0112878 A1 * | 6/2003 | Kloper ....................... | 375/259 |
| 2003/0126195 A1 * | 7/2003 | Reynolds et al. ............ | 709/203 |
| 2004/0208191 A1 * | 10/2004 | Rajsic et al. ................. | 370/409 |
| 2005/0111374 A1 * | 5/2005 | Sierecki ...................... | 370/249 |
| 2005/0232269 A1 * | 10/2005 | Yao et al. ..................... | 370/389 |
| 2007/0071014 A1 * | 3/2007 | Perera et al. ................ | 370/396 |

OTHER PUBLICATIONS

Microsoft et al., "An Interoperable End-to-End Broadband Service Architecture over ADSL Systems," Jul. 3, 1997.
Nortel Networks, "Passport Multiservice Switch Portfolio".
Alcatel "Alcatel 7670 Routing Switch Plateform (RSP)".

* cited by examiner

*Primary Examiner*—Anh-Vu H Ly
(74) *Attorney, Agent, or Firm*—Greenblum & Bernstein, P.L.C.

(57) ABSTRACT

A multi service platform including a layer two switching component and a layer three switching component is connected to a layer two network and a layer three network. The layer two switching component is a terminating point for the layer two network, whereas the layer three switching component terminates the layer three network A virtual UNI connection is established between the components increasing reliability of end to end connections across the networks, and simplifying provisioning of these types of networks.

14 Claims, 2 Drawing Sheets

LAYER 2/LAYER 3 INTERWORKING VIA INTERNAL VIRTUAL UNI

BACKGROUND OF THE INVENTION

1. Field of the Invention

The present invention relates to the field of communications. More particularly, the present invention relates to improving reliability when interconnecting layer two and layer three networks.

2. Background Information

FIG. 1 illustrates an example of today's networking environment. In today's networking environment, layer two access networks 12 are often employed to access layer three core networks 14. Thus, a customer 10 can access the layer three network 14 using layer two access mechanisms. This approach combines the flexibility of maintaining layer two access with the flexibility of supporting multiple virtual connections from a physical access port. These multiple virtual connections are available without full mesh virtual connections among all customer sites due to the layer three connectionless forwarding capabilities.

An example of such a topology is an IP (Internet protocol) enabled frame relay/ATM (asynchronous transfer mode) network. Failures within the layer two network 12 are handled by the layer two failure recovery schemes. Failures within the layer three network 14 are handled by the layer three failure recovery schemes. Failures on the UNI (user to network interface) connections 16 between the layer two network 12 and the layer three network 14, however, are not protected by these recovery schemes and thus become single points of failure.

As shown in FIG. 2, a multi service platform 20 is conventionally provided in the layer three network 14. The multi service platform 20 includes layer two switching capabilities 22 and layer three switching capabilities 24. In today's multi service platforms 20, the layer two portion 22 is independent from and isolated from the layer three portion 24. Typically, the layer three portion 24 of the multi service platform 20 terminates the UNI connection 16. Thus, when the UNI connection 16 (either the link or a port) fails, the layer two network 12 will not re-route a circuit to the multi service platform 20 in the layer three network 14 because the layer two network only extends to the UNI connection 16. Although FIG. 2 shows a core layer three network 14, another layer two network may be provided instead of the layer three network 14.

Current solutions addressing the single point of failure problem include dual homing from a customer site 10 to the layer three core 14. In this case, when one connection fails, the other connection can maintain connectivity. This approach, however, consumes too many network resources by requiring both paths to be permanently maintained in the layer two network 12, also adding significant complexity to the provisioning and maintenance procedures for this service.

Another solution reduces the length of the UNI connection 16 between the layer two network 12 and the layer three network 14 by deploying layer two and layer three switches within the same central office. Thus, the connection 16 becomes an intra-central office connection. This solution, however, increases the overall switch deployment cost and is still subject to a single point of failure.

Thus, a solution is needed to address the single point of failure problem without increasing consumption of network resources.

Provisioning a circuit using current multi service platforms 20 entails a complicated two step process. Initially, the terminating multi service platform 20 is identified, and it is determined which layer two switch will connect to the multi service platform 20. A circuit can then be provisioned between the customer 10 and the identified layer two switch, which connects to the multi service platform 20. Finally, the layer three portion 24 of the platform 20 must be provisioned.

It would be desirable to have a simpler provisioning process.

BRIEF DESCRIPTION OF THE DRAWINGS

The present invention is further described in the detailed description that follows, by reference to the noted drawings by way of non-limiting examples of embodiments of the present invention, in which like reference numerals represent similar parts throughout several views of the drawings, and in which.

DETAILED DESCRIPTION OF EMBODIMENTS

Figure 1:
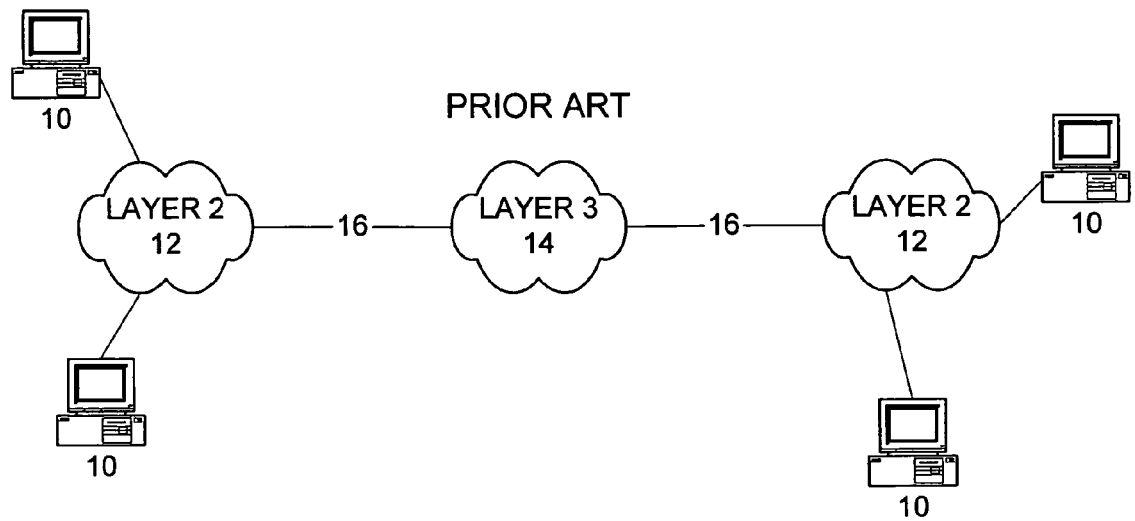
FIG. 1 is a diagram showing a prior art networking environment.
Figure 2:
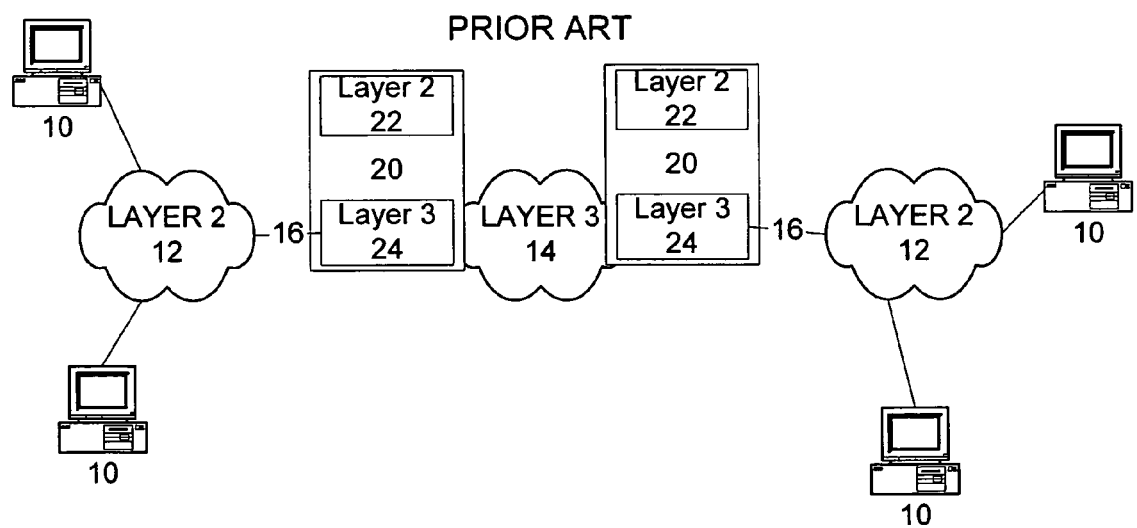
FIG. 2 is a diagram showing a prior art networking environment, including a multi-service platform.

The present invention relates to increasing reliability of interconnected layer two and layer three networks. The increased reliability is achieved by providing a virtual UNI between layer two and layer three switches within a multi service platform.

In view of the above, the present invention through one or more of its various aspects and/or embodiments is presented to accomplish one or more objectives and advantages, such as those noted below.

According to an aspect of the present invention, a multi service platform includes a layer two switching component, a layer three switching component, and an internal connection. the internal connection terminates at the layer two switching component and at the layer three switching component. Thus, layer two capabilities and layer three capabilities are integrated together. In one embodiment, the connection is an internal virtual UNI connection.

According to another aspect of the present invention, a network includes a layer two network, a layer three network, and a platform. The platform includes a layer two switching component, a layer three switching component and a connection between the layer two switching component and the layer three switching component. The layer two switching component of the platform is protected by the layer two network's failure restoration, and the layer three switching component of the platform is protected by the layer three network's failure restoration.

In one embodiment, the connection is an internal virtual UNI connection. Moreover, the layer two network may be an ATM network, and the layer three network may be an IP network. Similarly, the layer two switching component of the platform may be an ATM switch, and the layer three switching component of the platform may be an IP router.

According to a further aspect of the present invention, a method is provided for routing traffic across a layer two network and across a layer three network. The method includes routing traffic from a customer across the layer two network to a layer two switching component in a platform. The method also includes routing traffic from the layer two switching component across an internal virtual UNI connection to a layer three switching component in the platform. The method further includes routing traffic from the layer three switching component across the layer three network.

In one embodiment, the layer two network is an ATM network. In another embodiment, the layer three network is an IP network. The layer two switching component of the platform may be an ATM switch. The layer three switching component of the platform may be an IP router.

According to yet another aspect of the present invention, a method is provided for provisioning a circuit in a layer two/layer three network. The method includes locating a customer's port, locating an internal virtual UNI port, and establishing a connection between the customer's port and the internal virtual UNI port.

According to still yet another aspect of the present invention, a method is provided for routing traffic across a plurality of layer two networks. The method includes routing traffic from a customer across a first layer two network to a layer two switching component in a platform. The method also includes routing traffic from the layer two switching component across an internal virtual UNI connection to a layer three switching component in the platform. At the layer three switching component, virtual channel information is determined. Then, traffic the virtual channel information are routed from the layer three switching component across the internal virtual UNI connection to the layer two switching component in the platform. Finally, the method includes routing traffic from the layer two switching component across another layer two network based on the virtual channel information.

The various aspects and embodiments of the present invention are described in detail below.

The present invention improves reliability of interconnected layer two/layer three networks by extending the layer two network to the layer two switching component of a multi service platform. Thus, if an interface between the layer two switch and the layer two switching component of the multi service platform fails, the layer two network failure recovery scheme re-routes the circuit to the layer two switching component of the multi service platform. Similarly, if an interface between the layer three switch and the layer three switching component of the multi service platform fails, the layer three network failure recovery scheme re-routes the circuit to the layer three portion of the multi service platform.

Figure 3:
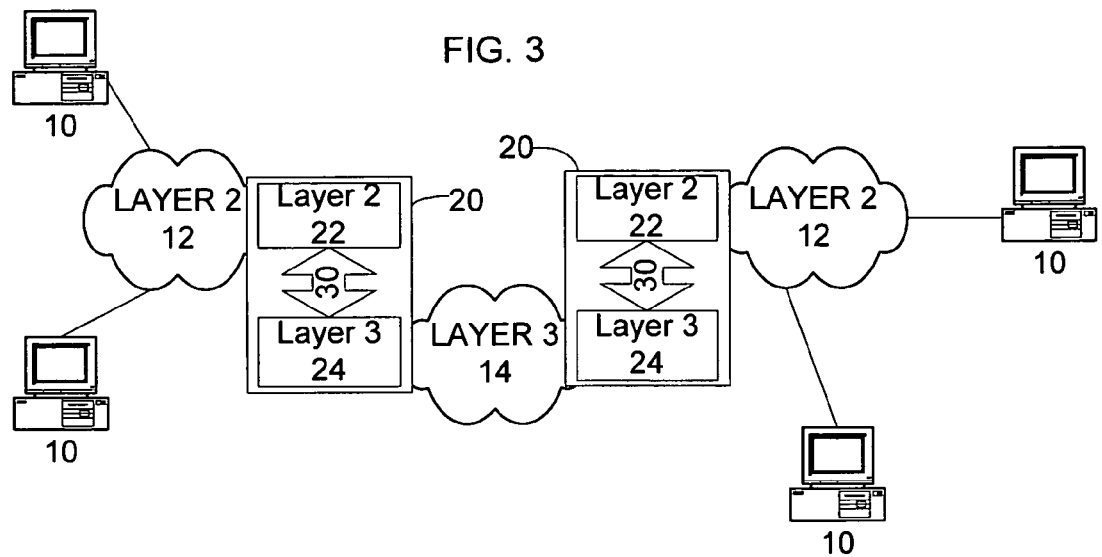
FIG. 3 is a diagram showing a networking environment, including a multi-service platform, according to an aspect of the present invention.

Referring now to FIG. 3, an embodiment of the present invention is shown. The multi service platform 20 includes an internal virtual UNI connection 30 which connects the layer two switching component 22 of the platform 20 and the layer three switching component 24 of the platform 20. The UNI connection 30 is considered to be virtual because it is within the multi service platform 20, rather than between two physical ports.

In one embodiment, the layer two network 12 is an ATM network, and the layer three network 14 is an IP network, although any other type of layer two and layer three networks can be provided, for example, an ethernet network. In the ATM/IP embodiment, the multi service platform 20 includes an ATM switch as the layer two portion 22 and an IP router as the layer three portion 24. An exemplary multi service platform 20 is an Alcatel 7670 RSP (routing switch platform), available from Compagnie Financiere Alcatel of France.

In the ATM/IP embodiment, the ATM network 12 terminates on the ATM switch 22 in the platform 20. The IP network 14 connects to the IP router 24. A virtual internal UNI 30 connects the IP router 24 and the ATM switch 22 within the multi service platform 20. Thus, the ATM network 12 includes the ATM switch 22 and accordingly protects the switch 22 with its failure restoration. Similarly, the IP router 24 is part of the IP network 14 and is thus covered by the IP network's failure recovery schemes.

Implementation of the internal virtual UNI 30 is architecture dependent and relatively straight forward. The internal virtual UNI 30 could be a standard ATM connection using internal ATM ports. Alternatively, the connection 30 could be between a chip on the router 24 and a chip on the ATM switch 22. In another embodiment, the ATM connection is simpler than a standard ATM connection. In still another embodiment when the router 24 and switch 22 are on a common bus, the connection 30 can be implemented with control signaling.

The internal virtual UNI 30 thus becomes the only unprotected link. The failure probability of the link 30 is low, however, due to fact that the connection is internal to the platform 20 and not subject to cable cut failure, and because the link is so short. Moreover, the reliability is further enhanced by the extension of the layer two network's recovery scheme and the extension of the layer three network's recovery scheme.

Provisioning of a circuit in a network employing the present invention is also simplified. That is, the provisioning is a one step process. The customer's port and the internal virtual UNI's port are located and then a connection can be established.

Another advantage of the present invention is the saving of physical ports and associated transport facilities on the multi service platform 20 for trunking. This savings contrasts with deployment of a layer two and layer three switch in the same physical central office and interconnecting the switches with physical trunk ports.

Figure 4:
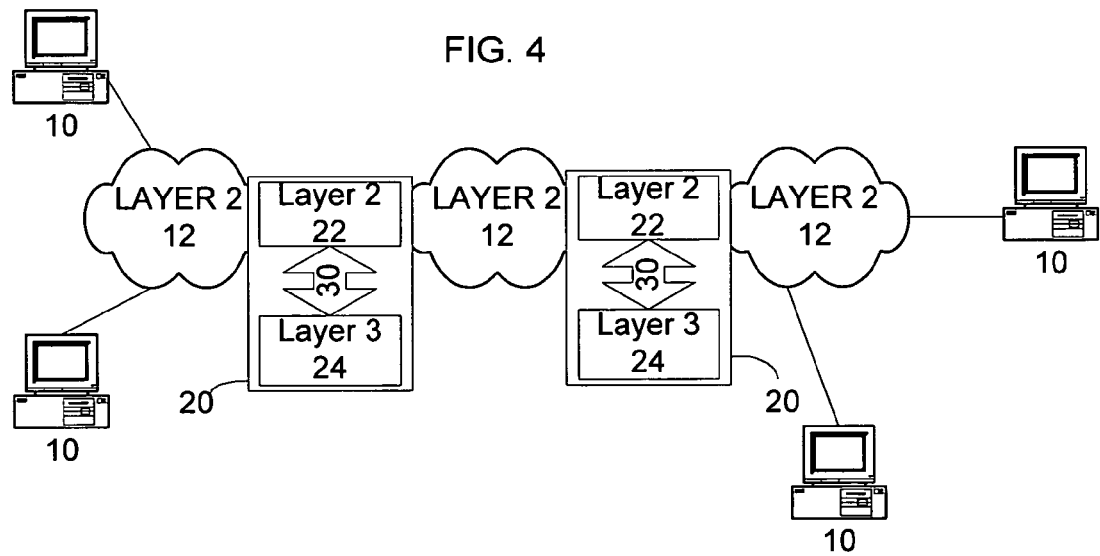
FIG. 4 is a diagram showing a networking environment, including a multi-service platform, according to another aspect of the present invention.

Another embodiment is shown in FIG. 4. In FIG. 4, a layer two network 12 is provided between the multi service platforms 20. In this case, the layer two switching component 22 connects to each layer two network 12. In operation, the layer two switching component 22 directs all traffic via the virtual UNI 30 to the layer three switching component 24. The layer three switching component 24 then consults its routing tables in order to determine how to route the traffic. Subsequently, the layer three switching component 24 selects an appropriate virtual channel and forwards this information back to the layer two switching component 22, which then forwards the traffic to the correct interface based upon the received information.

Thus, the present invention provides an internal virtual UNI connection between layer two and layer three switching components of a multi service platform thereby improving end to end reliability. It is understood that the words that have been used are words of description and illustration, rather than words of limitation. Changes may be made within the purview of the appended claims, as presently stated and as amended, without departing from the scope and spirit of the invention in its aspects. Although the invention has been described with reference to particular means, materials and embodiments, the invention is not intended to be limited to the particulars disclosed; rather, the invention extends to all functionally equivalent structures, methods, and uses such as are within the scope of the appended claims.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet-switched network transmission and public telephone networks represent examples of the state of the art. Such standards are periodically superseded by faster or more efficient equivalents having essentially the same functions. Accordingly, replacement standards and protocols having the same functions are considered equivalents.

What is claimed:

1. A multi service platform having multiple layer switching, comprising:
    a layer two switching component disposed within the multi service platform;
    a layer three switching component disposed within the multi service platform; and
    a connection, including, an internal virtual UNI connection, terminating at the layer two switching component and at the layer three switching component, and disposed within the multi service platform without the use of external physical ports,
    wherein the layer two switching component and the layer three switching component are integrated together within the multi service platform and the internal virtual UNI connection is not subject to a cable cut.

2. A network, comprising:
    a layer two network;
    a layer three network; and
    a multi service platform including a layer two switching component, a layer three switching component and a connection, including an internal virtual UNI connection that does not use of external physical ports and that is disposed between the layer two switching component and the layer three switching component, said layer two switching component, said layer three switching component and said internal UNI connection are all disposed within the multi service platform;
    wherein the layer two switching component of the platform is protected by the layer two network's failure restoration, and wherein the layer three switching component of the platform is protected by the layer three network's failure restoration; and
    wherein the layer two switching component and the layer three switching component are integrated together within the multi service platform and the internal virtual UNI connection is not subject to a cable cut.

3. The network of claim 2, in which the layer two network comprises an ATM network.

4. The network of claim 3, in which the layer two switching component of the platform comprises an ATM switch.

5. The network of claim 2, in which the layer three network comprises an IP network.

6. The network of claim 5, in which the layer three switching component of the platform comprises an IP router.

7. A method for routing traffic across a layer two network and across a layer three network including a multi service platform having multiple layer switching, comprising:
    routing traffic from a customer across the layer two network to a layer two switching component disposed in the multi service platform;
    routing traffic from the layer two switching component across an internal virtual UNI connection disposed in the multi service platform without the use of external physical ports to a layer three switching component disposed in the multi service platform; and
    routing traffic from the layer three switching component across the layer three network;
    wherein the layer two switching component and the layer three switching component are integrated together within the multi service platform and the internal virtual UNI connection is not subject to a cable cut.

8. The method of claim 7, in which the layer two network comprises an ATM network.

9. The method of claim 8, in which the layer two switching component of the platform comprises an ATM switch.

10. The method of claim 7, in which the layer three network comprises an IP network.

11. The method of claim 10, in which the layer three switching component of the platform comprises an IP router.

12. A method for routing traffic across a plurality of layer two networks, comprising:
    routing traffic from a customer across a first layer two network to a layer two switching component disposed in a multi service platform;
    routing traffic from the layer two switching component across an internal virtual UNI connection disposed in the multi service platform without the use of external physical ports to a layer three switching component disposed in the multi service platform;
    determining virtual channel information at the layer three switching component;
    routing traffic and the virtual channel information from the layer three switching component across the internal virtual UNI connection to the layer two switching component in the platform; and
    routing traffic from the layer two switching component across another layer two network based on the virtual channel information
    wherein the layer two switching component and the layer three switching component are integrated together within the multi service platform and the internal virtual UNI connection is not subject to a cable cut.

13. The method of claim 12, in which the layer two network comprises an ATM network.

14. The method of claim 12, in which the layer three network comprises an IP network.

* * * * *